United States Patent
Na

(10) Patent No.: US 9,157,621 B2
(45) Date of Patent: Oct. 13, 2015

(54) DEVICE FOR FIXING WARNING LAMP OF A CONSTRUCTION MACHINE

(75) Inventor: Seong-Yoon Na, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 180 days.

(21) Appl. No.: 13/995,234

(22) PCT Filed: Dec. 23, 2010

(86) PCT No.: PCT/KR2010/009255
§ 371 (c)(1),
(2), (4) Date: Jun. 18, 2013

(87) PCT Pub. No.: WO2012/086862
PCT Pub. Date: Jun. 28, 2012

(65) Prior Publication Data
US 2013/0301284 A1 Nov. 14, 2013

(51) Int. Cl.
*A47B 96/06* (2006.01)
*F21V 21/26* (2006.01)
(Continued)

(52) U.S. Cl.
CPC .............. *F21V 21/26* (2013.01); *B60Q 1/2657* (2013.01); *B60Q 1/2692* (2013.01); *E02F 9/0858* (2013.01); *E02F 9/16* (2013.01); *E02F 9/26* (2013.01)

(58) Field of Classification Search
CPC ...... B60Q 1/2692; B60Q 1/2657; B60Q 1/26; B60Q 1/2611; B60Q 1/2615; B60Q 7/00; E02F 9/16; E02F 9/0858; E02F 9/26
USPC ................... 248/184.1, 284.1, 291.1, 292.12, 248/292.13; 362/523, 418, 419, 427, 540, 362/542
See application file for complete search history.

(56) References Cited

U.S. PATENT DOCUMENTS 2,305,656 A * 12/1942 Yopp .............................. 340/473
4,787,145 A * 11/1988 Klicker et al. ............... 30/275.4
(Continued)

FOREIGN PATENT DOCUMENTS

| CN | 201059450 Y | 5/2008 |
| DE | 20008502 U1 | 9/2000 |

(Continued)

OTHER PUBLICATIONS

Office Action issued in corresponding Chinese Patent Application 201080070772.2 on Nov. 2, 2014 (5 pages).
(Continued)

*Primary Examiner* — Christopher Garft
(74) *Attorney, Agent, or Firm* — Harness, Dickey & Pierce, P.L.C.

(57) ABSTRACT

A device for fixing a warning lamp of a construction machine according to the present invention is disposed on a side of a frame of an operating compartment, and includes an upper sleeve, a fixing bracket, a lower sleeve, a supporting lever, an upper elastic member, and a lower elastic member. The supporting lever spaces the upper sleeve apart from the lower sleeve by a certain distance, and rotatably supports the upper sleeve and the lower sleeve. The upper elastic member and the lower elastic member are coupled to both side ends of the supporting lever to elastically support the upper sleeve and the lower sleeve respectively, and are coupled in a multi-joint structure. When the construction machine is on a construction site in wet weather, or is kept on a certain site, the warning lamp can be adjusted to various postures.

5 Claims, 3 Drawing Sheets

(51) Int. Cl.
*E02F 9/08* (2006.01)
*E02F 9/16* (2006.01)
*E02F 9/26* (2006.01)
*B60Q 1/26* (2006.01)

(56) References Cited

U.S. PATENT DOCUMENTS

| | | | | |
|---|---|---|---|---|
| 4,917,343 | A * | 4/1990 | Wainscott | 248/447.2 |
| 5,255,403 | A * | 10/1993 | Ortiz | 5/503.1 |
| 5,278,735 | A * | 1/1994 | Her | 362/542 |
| 6,176,601 | B1 * | 1/2001 | Nester | 362/477 |
| 7,385,526 | B1 * | 6/2008 | Bullard et al. | 340/932.2 |
| 2005/0151040 | A1 | 7/2005 | Hsu | |
| 2007/0040086 | A1 * | 2/2007 | Liao | 248/291.1 |
| 2013/0200236 | A1 * | 8/2013 | Wood | 248/291.1 |

FOREIGN PATENT DOCUMENTS

| | | |
|---|---|---|
| KR | 1999-006169 U | 2/1999 |
| KR | 20-0363635 Y1 | 10/2004 |
| KR | 20-0380450 Y1 | 3/2005 |
| KR | 20-0383354 Y1 | 5/2005 |
| KR | 20-0439329 Y1 | 4/2008 |

OTHER PUBLICATIONS

International Search Report (in Korean and English) and Written Opinion (in Korean) for PCT/KR2010/009255, mailed Sep. 29, 2011; ISA/KR.

International Preliminary Report on Patentability (Chapter II) (in Korean) for PCT/KR2010/009255, dated Apr. 18, 2013; IPEA/KR.

* cited by examiner

DEVICE FOR FIXING WARNING LAMP OF A CONSTRUCTION MACHINE

FIELD OF THE INVENTION

The present invention relates to a flashing lamp fixing device for a construction machine. More particularly, the present invention relates to an improved flashing lamp fixing device for a construction machine in which the flashing lamp mounted at an cab frame is angularly adjusted to various fixed orientations so that foreign substances including moisture or earth and sand, and rock powder can be prevented from infiltrating into the flashing lamp as well as any collision or interference with an external object can be reduced.

BACKGROUND OF THE INVENTION

In general, a construction machine including an excavator or a shovel requires a flashing lamp mounted at a side of an upper portion of an cab frame so as to emit a warning light to the outside so that a danger can be warned which may occur during the work.

FIG. 1 is a schematic perspective view showing a conventional flashing lamp fixing structure for a construction machine in accordance with the prior art.

When a flashing lamp 1 is mounted at a side of the cab frame, it is erectly securely fixed to an upper end of a rod 2 pivotally mounted to a bracket 3. When the flashing lamp 1 is operated, it is easily maintained so as to be identified visibly from the outside. The orientation of the flashing lamp 1 can be selectively adjusted between an upwardly erected position and a downwardly collapsed position facing the ground surface in use in order to prevent a damage due to collision or interference with an external equipment or a facility on a construction site depending on the circumstances.

However, when the flashing lamp 1 is used or stored for a long period of time in its state of being downwardly collapsed to face the ground surface, foreign substances including moisture or soil and rock powder generated from the construction site under rainy weather conditions as well as moisture or the like generated in a washing process may be infiltrated into the flashing lamp 1 through the bracket 3 and the rod 2 to cause the flashing lamp to be electrically short-circuited.

In addition, when the foreign substances adhere to the conventional flashing lamp fixing structure during the long-term use of the flashing lamp, there occurs a serious problem in that the flashing lamp and the bracket are erroneously operated and malfunctioned.

Meanwhile, as an example of a similar flashing lamp fixing technique, Korean Utility Model Laid-Open Publication No. 1999-006169 discloses a rotary type work lamp fixing structure in which a work lamp fixed to a boom of an excavator is rotated by means of a bracket attached to left and right side plates of the boom and a lamp-fixing pin. This technique has an advantage in that the lamp fixed to the upper portion of the bracket is always oriented toward the front of the excavator so that the irradiation angle of the work lamp for the excavator is maintained constantly, but still entails an disadvantage in that the orientation of the work lamp, i.e., a lamp support angle cannot be changed and then kept in a fixed state during the storage of the work lamp fixing structure or under variable work circumstances.

DETAILED DESCRIPTION OF THE INVENTION

Technical Problems

Accordingly, the present invention was made to solve the aforementioned problem occurring in the prior art, and it is an object of the present invention to provide a flashing lamp fixing device for a construction machine, in which the orientation angle of the flashing lamp is structurally adjusted variously and kept so that foreign substances including earth and sand or moisture can be prevented from being introduced to the inside of a flashing lamp and the connection portion of a fixing bracket.

Another object of the present invention is to provide a flashing lamp fixing device for a construction machine in which a support lever and a lower sleeve that are coupled in a multi-joint structure are pivotally rotated to cause the flashing lamp and the support lever to be kept in an horizontal orientation during the storage of the flashing lamp fixing device, and the flashing lamp is erected to be kept in a vertical orientation during the operation of the flashing lamp fixing device.

Technical Solution

To accomplish the above object, in accordance with an embodiment of the present invention, there is provided a flashing lamp fixing device for a construction machine, which is installed at one side of an cab frame, the flashing lamp fixing device including:

an upper sleeve securely fixed at a side of an outer circumferential surface thereof to a flashing lamp mounting plate and having a first pin-retaining indent formed at a front circumferential edge thereof;

a fixing bracket having a fixed body part and a sleeve mounting part, the fixed body part being mounted to the one side of the cab frame;

a lower sleeve securely fixed at a side of an outer circumferential surface thereof to the sleeve mounting part of the fixing bracket and having a second pin-retaining indent formed at a front circumferential edge thereof;

a support lever having an upper adjusting pin and a lower adjusting pin mounted adjacent to both ends thereof in such a manner that the upper adjusting pin is resiliently fit into the first pin-retaining indent of the upper sleeve and the lower adjusting pin is resiliently fit into the second pin-retaining indent of the lower sleeve, the support lever being configured to rotatably support the upper sleeve and the lower sleeve in such a manner that the upper sleeve and the lower sleeve are spaced apart from each other at a predetermined interval; and upper and lower elastic members joined to the both ends of the support lever and configured to elastically support the upper sleeve and the lower sleeve.

In addition, in the flashing lamp fixing device for a construction machine in accordance with the present invention, the upper and lower elastic members may be fittingly mounted into the upper sleeve and the lower sleeve, respectively.

Further, in the flashing lamp fixing device for a construction machine in accordance with the present invention, each of the upper sleeve and the lower sleeve may have a plurality of pin-retaining indents formed thereon.

Preferably, in the flashing lamp fixing device for a construction machine in accordance with the present invention, the first pin-retaining indents of the upper sleeve may be radially arranged at an angle of 90 degrees with respect to each other.

Preferably, in the flashing lamp fixing device for a construction machine in accordance with the present invention, the second pin-retaining indents of the lower sleeve may be radially arranged at an angle of 90 degrees with respect to each other.

Advantageous Effect

The flashing lamp fixing device for a construction machine in accordance with an embodiment of the present invention as constructed above has the following advantages.

The upper sleeve, the support lever, and the lower sleeve structurally performs a multi-articulate function, and the fixing angle of the flashing lamp is changed variously so that foreign substances including earth and sand or moisture can be prevented from introduced into the inside of the flashing lamp and a connection portion of the fixing bracket. In addition, even in the case where the construction machine is stored in any place or there occurs collision or interference between the construction machine and an external object, the flashing lamp and the support lever can be easily angularly adjusted to various orientations with respect to a side of the cab frame.

BRIEF DESCRIPTION OF THE INVENTION

The above objects, other features and advantages of the present invention will become more apparent by describing the preferred embodiments thereof with reference to the accompanying drawings, in which.

Figure 4:
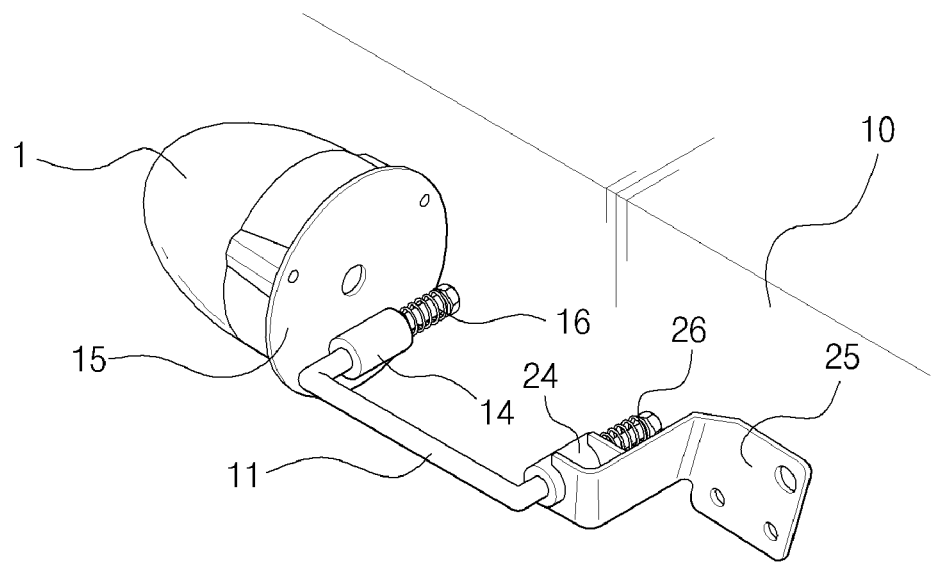
Figure 5:
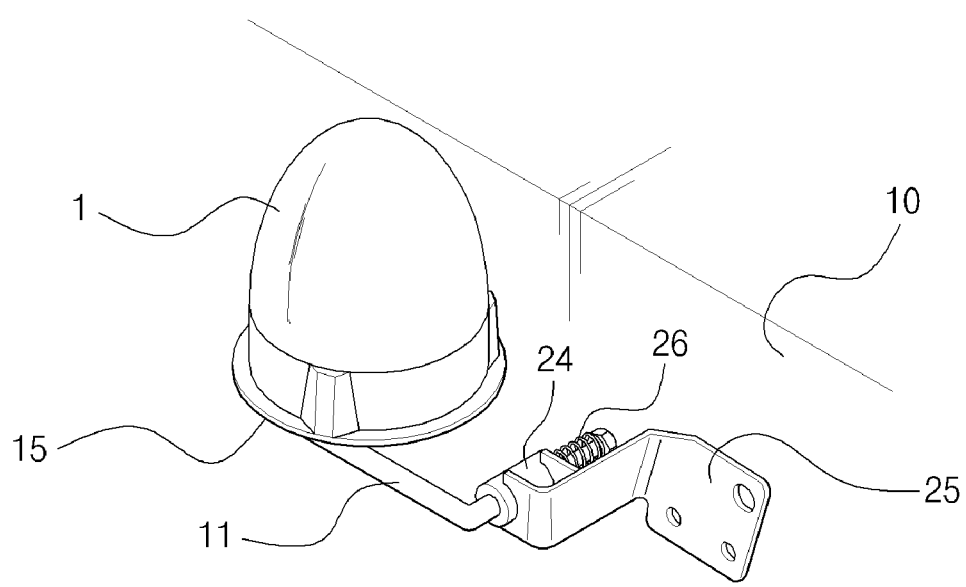

FIG. 4 is an assembled perspective view showing a flashing lamp fixing device for a construction machine in accordance with an embodiment of the present invention in which a flashing lamp and a support lever are fixedly oriented horizontally with respect to a side an cab frame; and FIG. 5 is an assembled perspective view showing a flashing lamp fixing device for a construction machine in accordance with an embodiment of the present invention in which only a flashing lamp is fixedly oriented vertically with respect to a side an cab frame.

PREFERRED EMBODIMENTS OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

Figure 1:
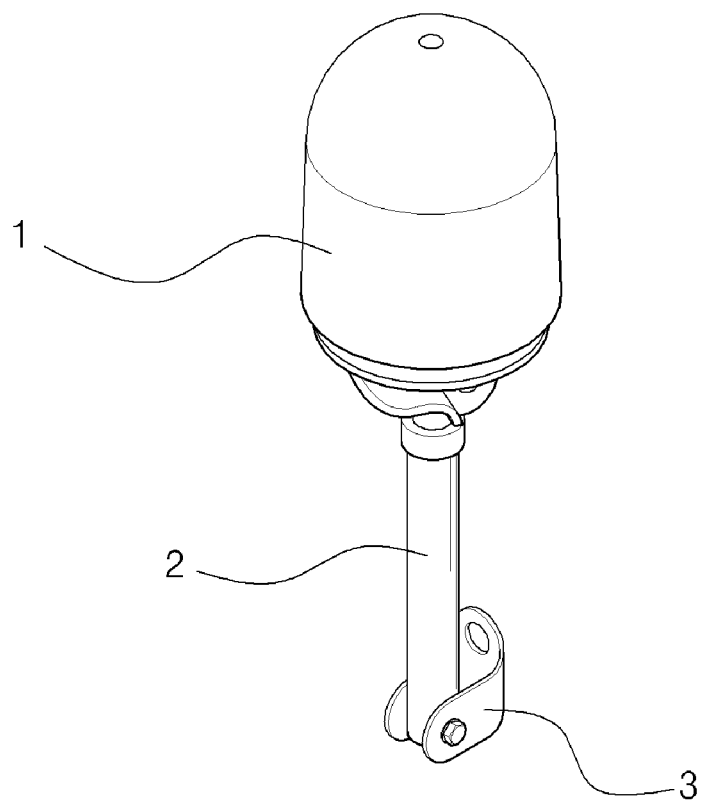
FIG. 1 is a schematic perspective view showing a conventional flashing lamp fixing structure for a construction machine in accordance with the prior art.

Prior to description of this embodiment, elements substantially identical to those in the prior art described with reference to FIG. 1 are designated by like reference numerals to avoid a redundant description.

A reference numeral 11 designates a support lever, a reference numeral 14 designates an upper sleeve, a reference numeral 15 designates a flashing lamp mounting plate, a reference numeral 16 designates an upper elastic member, a reference numeral 24 designates a lower elastic member, a reference numeral 25 designates a fixing bracket, and a reference numeral 26 designates a lower elastic member.

An embodiment in accordance with the present invention will be described centering on the structure in which the orientation of the flashing lamp is adjusted to a vertical or horizontal orientation with respect to a side of an upper portion of an cab frame 100 of an excavator or shovel for a construction machine.

Figure 2:
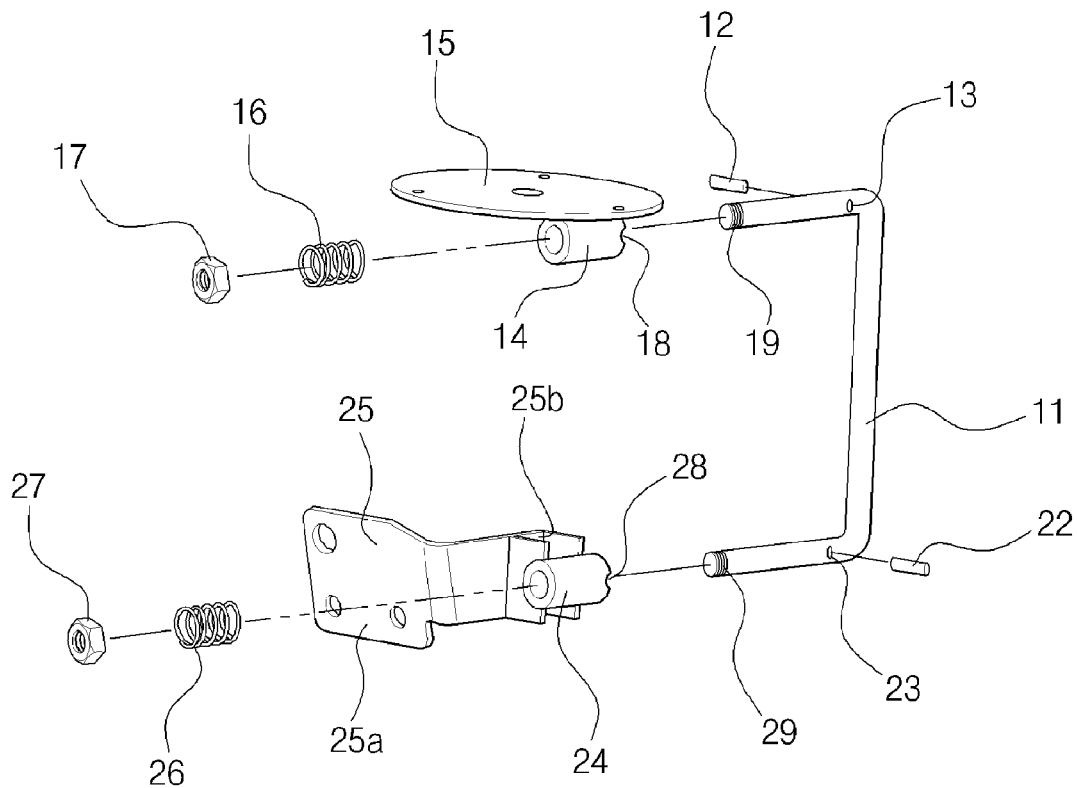
FIG. 2 is an exploded perspective view showing a flashing lamp fixing device for a construction machine in accordance with an embodiment of the present invention.

Referring to FIG. 2, a flashing lamp fixing device for a construction machine in accordance with the present invention is installed at one side of an cab frame 10.

The flashing lamp fixing device for a construction machine includes:

an upper sleeve 14 that is securely fixed at a side of an outer circumferential surface thereof to a flashing lamp mounting plate 15 and having a first pin-retaining indent 18 formed at a front circumferential edge thereof;

a fixing bracket 25 having a fixed body part 25a and a sleeve mounting part 25b, the fixed body part 25a being mounted to the one side of the cab frame 10;

a lower sleeve 24 that is securely fixed at a side of an outer circumferential surface thereof to the sleeve mounting part 25b of the fixing bracket 25 and having a second pin-retaining indent 28 formed at a front circumferential edge thereof;

a support lever 11 having an upper adjusting pin 12 and a lower adjusting pin 22 mounted adjacent to both ends thereof in such a manner that the upper adjusting pin 12 is resiliently fit into the first pin-retaining indent 18 of the upper sleeve 14 and the lower adjusting pin 22 is resiliently fit into the second pin-retaining indent 28 of the lower sleeve 24, the support lever 11 being configured to rotatably support the upper sleeve 14 and the lower sleeve 24 in such a manner that the upper sleeve 14 and the lower sleeve 24 are spaced apart from each other at a predetermined interval; and upper and lower elastic members 16 and 26 that are joined to the both ends of the support lever 11 and configured to elastically support the upper sleeve 14 and the lower sleeve 24.

During the assembly of the flashing lamp fixing device, upper and lower fastening members 17 and 27 are mounted to both ends of the support lever 11 so that the upper and lower sleeves 14 and 24, the upper and lower elastic members 16 and 26 are fixed in position so as to be prevented from escaping from the both ends of the support lever 11.

According to an embodiment of the present invention, the upper and lower elastic members 16 and 26 are fittingly mounted into the upper sleeve 14 and the lower sleeve 24, respectively.

In addition, each of the upper sleeve 14 and the lower sleeve 24 may have a plurality of pin-retaining indents 18 and 28 formed thereon.

In order to help to understand the invention in an embodiment of the present invention, a state is shown in which both ends of each of the upper and lower adjusting pins 12 and 22 are formed at an angle of 180° with respect to each other so as to be seated in the first and second pin-retaining indents 18 and 28.

Preferably, the first pin-retaining indents 18 of the upper sleeve 14 may be radially arranged at an angle of 90 degrees with respect to each other, and the second pin-retaining indents 28 of the lower sleeve 24 are also radially arranged at an angle of 90 degrees with respect to each other. It is of course noted that the arrangement angle of the first pin-retaining indents 18 and the second pin-retaining indent 28 can be modified variously in consideration of the relative displacement between the upper sleeve 14 and the lower sleeve 24 during the pivotal rotation of the support lever 11.

Meanwhile, the upper and lower fastening members 17 and 27 are preferably formed as a bolt member to facilitate the fastening thereof at both ends of the support lever 11, but a pin engagement member or a mechanical coupling member may be applied in consideration of the frictional force of the upper sleeve 14 and the lower sleeve 24.

A non-reference numeral 13 denotes an upper pin hole and a non-reference numeral 23 denotes a lower pin hole.

Hereinafter, the operation principle of the flashing lamp fixing device for a construction machine in accordance with the present invention will be described.

Figure 3:
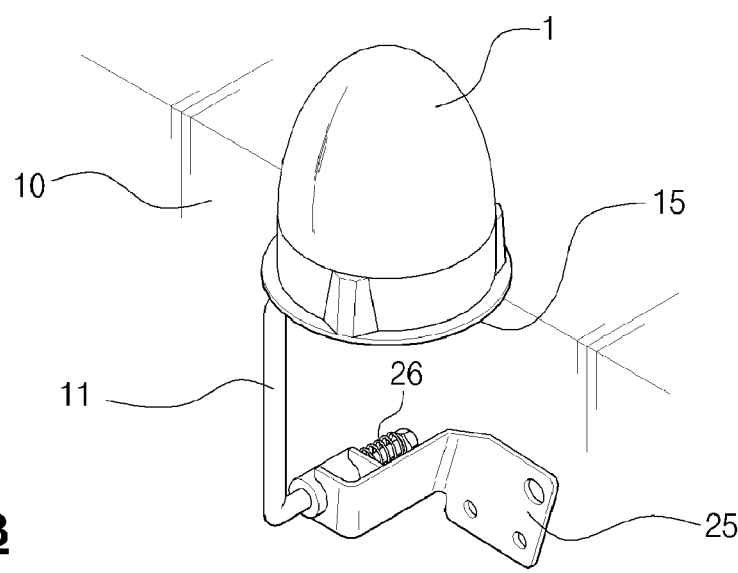
FIG. 3 is an assembled perspective view showing a flashing lamp fixing device for a construction machine in accordance with an embodiment of the present invention in which a flashing lamp and a support lever are fixedly oriented vertically with respect to a side an cab frame.

As shown in FIG. 3, the flashing lamp 1 is mounted at the flashing lamp mounting 15 at ordinary times so that it is fixedly oriented vertically with respect to a side of an cab frame together with the support lever 11.

During the construction work such as excavation or loading of earth and sand, which is required in a construction site, a vibration or external force transferred to the flashing lamp through the cab frame can be buffered and absorbed via the upper elastic member 16, the support lever 11, and the lower elastic member 26. Although the flashing lamp 1 receives an extreme vibration, it is held firmly in a vertical orientation with respect to a side of an cab frame.

The flashing lamp fixing device for a construction machine in accordance with the present invention can change the orientation of the flashing lamp 1 through the adjustment of the orientation angle of the upper sleeve 14, the support lever 11 and the lower sleeve 24 that are coupled in a multi-joint structure to fit the needs when the construction machine is placed on a construction site under rainy weather conditions or is stored in a certain other place.

For example, when the construction machine is stored on a construction site, earth and sand or moisture on the construction site can infiltrate into the flashing lamp 1 that is in an erect orientation. In this case, it is preferable to change the orientation of the flashing lamp 1 to a vertical orientation relative to an operator's cab. That is, as shown in FIG. 4, when an operator pulls the support lever 11 with an external force exceeding a frictional force by which the lower adjusting pin 22 is supportingly retained in the second pin-retaining indent 28, a lower end of the support lever 11 is released from the retaining state in which the lower adjusting pin 22 is retained in the second pin-retaining indent 28 of the lower sleeve 24 by the elastic force of the lower elastic member 26 to cause the support lever 11 to be pivotally rotated by 90° or 180°.

An upper end of the support lever 11 pivotally rotated is maintained in its initial retaining state in which the adjusting pin 12 is retained in the first pin-retaining indent 18 of the upper sleeve 14 by the elastic force of the upper elastic member. Ultimately, after the pivotal rotation of the support lever 11 relative to the lower sleeve 24 is sufficiently performed, the flashing lamp 1 and the support lever 11 are fixedly oriented horizontally with respect to a side of the cab frame 10.

If the pivotal rotation between the support lever 11 and the upper sleeve 14 is needed, for example, the orientation of the flashing lamp 1 needs to be adjusted to a vertical orientation with respect to a side of the cab frame 10 while the support lever 11 is held in a horizontal orientation with respect to a side of the cab frame 10, the operator can perform an additional manipulation of pulling the support lever 11 with an external force exceeding a frictional force by which the upper adjusting pin 12 is supportingly retained in the first pin-retaining indent 18 by means of the elastic force of the upper elastic member 16.

Referring to FIG. 5, during the additional manipulation by the operator, the flashing lamp mounting plate 15 and the upper sleeve 14 are pivotally rotated about the upper end of the support lever 11 while the support lever 11 is held in a horizontal orientation with respect to a side of the cab frame 10 in a state of being suspended from the lower sleeve 24.

In this case, it is of course noted that the upper end of the support lever 11 is released from the retaining state in which the upper adjusting pin 12 is retained in the first pin-retaining indent 18 of the upper sleeve 14 by the elastic force of the lower elastic member 26 to cause the support lever 11 to be pivotally rotated by 90° or 180° and the upper adjusting pin 12 to be re-retained in the first pin-retaining indent 18.

Thus, the flashing lamp mounting plate 15 and the flashing lamp 1 suspended from the upper end of the support lever 11 is adjusted to a secondary vertical orientation with respect to a side of the cab frame 10.

The adjustment of the secondary orientation of the support lever 11 and the flashing lamp 1 is advantageous in removing any collision or interference with an external object.

Although the adjustment of orientation of the flashing lamp 1 and the support lever 11 to a vertical and horizontal orientation with respect to a side of the cab frame 10 has been described in the foregoing embodiment and drawings of the present invention, the orientation of the flashing lamp 1 and the support lever 11 can be modified in various manners depending on the needs of the operator or user.

In accordance with a modified embodiment of the present invention, the first pin-retaining indents 18 of the upper sleeve 14 and the second pin-retaining indents 28 of the lower sleeve 24 may be radially arranged at a subdivided angle as well as at an angle of 90° or 180° in order to carry out the variation in the orientation of the flashing lamp 1 and the support lever 11. In this case, the principle of configuration in which the support lever 11 and the upper sleeve 14/the lower sleeve 24 are elastically rotatably coupled to each other is similar to that in the foregoing embodiment of the present invention, and thus its detailed description will be omitted to avoid redundancy.

In addition, the present invention can be modified or changed in various manners by a person of ordinary skill in the art without departing from the subject matter claimed in the appended claims in view of the configuration of the coupling between the upper elastic member 16 and the upper sleeve 14, and between the lower elastic member 26 and the upper sleeve 14. Therefore, the technical scope of the present invention is not limited to the above-mentioned particular preferred embodiment.

INDUSTRIAL APPLICABILITY

As described above, the flashing lamp fixing device for a construction machine in accordance with the present invention can be usefully utilized to change the orientation of the flashing lamp 1 through the adjustment of the various orientation angles of the upper sleeve 14, the support lever 11 and the lower sleeve 24 that are coupled in a multi-joint structure to fit the needs when the construction machine is placed on a construction site under rainy weather conditions or is stored in a certain other place.

The invention claimed is:

1. A flashing lamp fixing device for a construction machine, which is installed at one side of a cab frame, the flashing lamp fixing device comprising:
   an upper sleeve securely fixed at a side of an outer circumferential surface thereof to a flashing lamp mounting plate and having a first pin-retaining indent formed at a front circumferential edge thereof;
   a fixing bracket having a fixed body part and a sleeve mounting part, the fixed body part being mounted to the one side of the cab frame;

a lower sleeve securely fixed at a side of an outer circumferential surface thereof to the sleeve mounting part of the fixing bracket and having a second pin-retaining indent formed at a front circumferential edge thereof;

a support lever having an upper adjusting pin and a lower adjusting pin mounted adjacent to opposing ends thereof in such a manner that the upper adjusting pin is resiliently fit into the first pin-retaining indent of the upper sleeve and the lower adjusting pin is resiliently fit into the second pin-retaining indent of the lower sleeve, the support lever being configured to rotatably support the upper sleeve and the lower sleeve in such a manner that the upper sleeve and the lower sleeve are spaced apart from each other at a predetermined interval; and upper and lower elastic members adjacent to opposing ends of the support lever and configured to elastically support the upper sleeve and the lower sleeve.

2. The flashing lamp fixing device according to claim 1, wherein the upper and lower elastic members are fittingly mounted into the upper sleeve and the lower sleeve, respectively.

3. The flashing lamp fixing device according to claim 2, wherein the upper sleeve has a plurality of first pin-retaining indents and the lower sleeve has a plurality of second pin-retaining indents.

4. The flashing lamp fixing device according to claim 3, wherein the first pin-retaining indents of the upper sleeve are radially arranged at an angle of 90 degrees with respect to each other.

5. The flashing lamp fixing device according to claim 3, wherein the second pin-retaining indents of the lower sleeve are radially arranged at an angle of 90 degrees with respect to each other.

* * * * *